A. B. COBB.
PURIFIER FOR ACETYLENE GAS.
APPLICATION FILED MAY 4, 1912.
1,034,204.
Patented July 30, 1912.
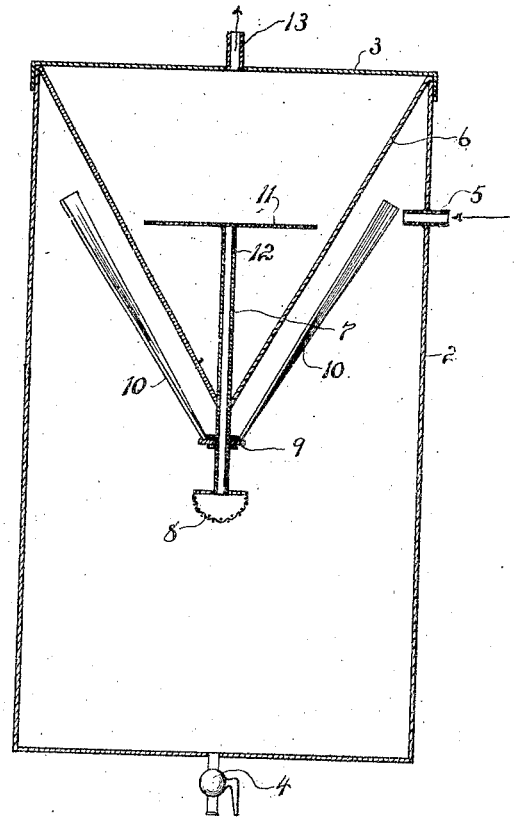

UNITED STATES PATENT OFFICE.

ALBERT B. COBB, OF WATERBURY, CONNECTICUT.

PURIFIER FOR ACETYLENE GAS.

1,034,204.

Specification of Letters Patent. Patented July 30, 1912.

Application filed May 4, 1912. Serial No. 695,164.

*To all whom it may concern:*

Be it known that I, ALBERT B. COBB, a citizen of the United States, residing at Waterbury, in the county of New Haven and State of Connecticut, have invented a new and useful Improvement in Purifiers for Acetylene Gas; and I do hereby declare the following, when taken in connection with the accompanying drawing and the characters of reference marked thereon to be a full, clear, and exact description of the same, and which said drawing constitutes part of this application and represents a vertical sectional view of a condenser for acetylene gas constructed in accordance with my invention.

This invention relates to an improvement in purifiers for acetylene gas.

Acetylene gas as it comes from the generator is liable to contain more or less particles of calcium carbid and a superfluous amount of moisture.

The object of this invention is to provide a purifier or condenser which is located adjacent to the generator and through which gas passes from the generator to the burners; and the invention consists in the construction hereinafter described and particularly recited in the claims.

In carrying out my invention, I employ a tank or casing 2 closed at its upper end by a cap or cover 3 and provided at its lower end with an outlet valve 4. Into one side of the tank a pipe 5 opens which pipe conducts gas from the generator, not shown. Mounted in the top of the casing is a funnel shaped container 6 closely fitting the top of the casing in which it may be held by the cap 3. Mounted in the bottom of the funnel and so as to close the lower end is a pipe 7 carrying at its lower end a strainer 8, and swiveled on the pipe above the strainer is a disk 9 carrying blades 10 more or less in number. The upper end of the pipe near the funnel is closed by a baffle plate 11, and the pipe 7 is formed with perforations 12 just below the plate. The top or cap 3 is provided with the usual outlet 13 for connection with the burners. Gas being admitted from the generator enters the casing 2 in line with the upper ends of the fan blades 10 causing those blades to revolve and so as to throw off the superfluous moisture in the gas and any particles which it may contain. The substance thrown off will settle to the bottom of the casing. The gas thus purified passes through the strainer 8 into the pipe 7 and escapes through the perforations 12 below the baffle plate 11 by which it is directed against the sides of the funnel, and if there are any particles carried by the gas they will be removed by friction with the baffle plate. Pure gas will accumulate in the top of the funnel and pass to the burners when desired.

With this device a quantity of gas may always be stored ready for immediate use.

I claim:—

1. A gas purifier consisting of a casing having an inlet for gas, a funnel mounted in the top of the casing, a vertically arranged pipe closing the bottom of the funnel and opening at the upper end into the funnel, and a series of blades swiveled on the pipe below the funnel, and an outlet from the top of the casing.

2. A gas purifier comprising a casing provided with a top, inlet and outlet openings for gas, a funnel located within the casing, a pipe entering the lower end of the funnel, a disk swiveled on said pipes, and blades carried by said disk and adapted to be revolved around said funnel.

3. A gas purifier comprising a casing provided with inlet and outlet openings for gas, a funnel mounted in the upper end of the casing, a pipe carried by said funnel which pipe opens from the bottom of the casing into the said funnel, fan blades swiveled on said pipe below said funnel, and a baffle plate secured at the upper end of said pipe.

In testimony whereof, I have signed this specification in the presence of two subscribing witnesses.

ALBERT B. COBB.

Witnesses:
GEO. H. BOOTH,
WILLIAM J. LARKIN, Jr.